US006768965B2

(12) United States Patent
Martin et al.

(10) Patent No.: US 6,768,965 B2
(45) Date of Patent: Jul. 27, 2004

(54) METHODS AND COMPUTER PROGRAM PRODUCTS FOR CHARACTERIZING A CRYSTALLINE STRUCTURE

(75) Inventors: Stephen L. Martin, Vancouver, WA (US); Shigeru Oba, Vancouver, WA (US); Yoshinori Suzuki, Fukushima-ken (JP)

(73) Assignee: SEH America, Inc., Vancouver (CA)

( * ) Notice: Subject to any disclaimer, the term of this patent is extended or adjusted under 35 U.S.C. 154(b) by 88 days.

(21) Appl. No.: 10/124,901

(22) Filed: Apr. 18, 2002

(65) Prior Publication Data

US 2003/0200047 A1 Oct. 23, 2003

(51) Int. Cl.[7] .......................... G01B 15/00; G01B 7/00; G06F 15/00
(52) U.S. Cl. .......................... 702/155; 438/16; 438/71
(58) Field of Search .................. 702/155, 166, 702/170; 438/14, 16, 71; 257/618, 629

(56) References Cited

U.S. PATENT DOCUMENTS

| 4,408,884 | A |   | 10/1983 | Kleinknecht et al. |
| 4,849,916 | A |   | 7/1989 | Abbe et al. |
| 5,420,803 | A | * | 5/1995 | Judell .......................... 702/170 |
| 5,712,701 | A |   | 1/1998 | Clementi et al. |
| 5,995,226 | A |   | 11/1999 | Abe et al. |
| 6,213,848 | B1 | * | 4/2001 | Campbell et al. .............. 451/41 |
| 6,255,664 | B1 |   | 7/2001 | Okawa et al. |
| 6,367,159 | B1 |   | 4/2002 | Naoi et al. |
| 6,417,108 | B1 |   | 8/2002 | Akino et al. |

| 2001/0014570 | A1 | 8/2001 | Wenski et al. |
| 2002/0132451 | A1 | 9/2002 | Akino et al. |
| 2003/0023402 | A1 | 1/2003 | Kobayashi et al. |

FOREIGN PATENT DOCUMENTS

| EP | 0 687 526 A | 12/1995 |
| EP | 0 806 266 A | 11/1997 |

OTHER PUBLICATIONS

*Wafer Analyzer™ Software—Visual Analysis Of Wafer Defect Data*, (copyright 1999–2000), <http://www.adesoftware.com/pdf/waferanalyzer.pdf>, 1 page. .

*OuterCheck™—Analysis Of Regional Wafer Data*, (copyright 1999–2000), <http://www.adesoftware.com/pdf/outercheck.pdf>, 2 pages. .

* cited by examiner

*Primary Examiner*—John Barlow
*Assistant Examiner*—Meagan S Walling
(74) *Attorney, Agent, or Firm*—Alston & Bird LLP

(57) ABSTRACT

Methods and computer program products are provided for analyzing a crystalline structure, such as a wafer or an epitaxial layer in more detail, including the portion of the crystalline structure proximate the edge. The methods and computer program products of one aspect determine the average thickness and the normalized profile of a crystalline structure with enhanced detail. Additionally, the method and computer program product of another aspect represent the profile proximate the edge of the crystalline structure with a pair of lines that are selected to permit the profile of the crystalline structure proximate the edge of the crystalline structure to be characterized in more detail. Further, the method of yet another aspect permits the average edge profile for a plurality of crystalline structure to be defined.

29 Claims, 4 Drawing Sheets

METHODS AND COMPUTER PROGRAM PRODUCTS FOR CHARACTERIZING A CRYSTALLINE STRUCTURE

FIELD OF THE INVENTION

The present invention relates generally to methods and computer program products for characterizing a crystalline structure, such as a wafer and, more particularly, to methods and computer program products for characterizing a portion of the surface of a crystalline structure proximate the edge of the crystalline structure.

BACKGROUND OF THE INVENTION

Semiconductor wafers serve as the substrate for a wide variety of microelectronic and semiconductor devices (hereinafter generally referred to as "devices"). As such, wafers are formed of silicon, germanium or the like and are doped in a manner appropriate for the subsequent device fabrication. In order to properly fabricate devices upon the wafer, the wafer must meet increasingly stringent specifications that are generally promulgated by the device manufacturers. Among other things, these specifications define the permissible thickness of the wafer and the requisite flatness of the major surface of the wafer upon which the devices will be formed. Accordingly, wafer manufacturers and/or device manufacturers measure a number of parameters which define the size and shape of the wafer to either insure that the wafer meets specifications or to identify the parameter(s) that are out of tolerance.

Wafer inspection systems have therefore been developed by ADE Corporation and others, such as NewCreation Co., Ltd. of Komae, Japan. These commercially available wafer inspection systems measure a variety of parameters that define the thickness, flatness and taper of a wafer and can provide various displays of this data, either on a global basis across the entire surface of the wafer or on a more particularized basis for each of a plurality of sites across the surface of a wafer which will, in turn, support a respective device.

As a result of the relatively stringent specifications, wafer manufacturers have designed the various stages of wafer fabrication to ensure that a large percentage of the wafers meet or exceed the specifications. For example, the polishing processes for polishing the major surface of the wafers on which the devices will be formed have been designed with a goal of producing wafers that meet or exceed the specifications. Notwithstanding the careful design of the various stages of the wafer fabrication process, it has generally been difficult to fabricate wafers that both have a consistent thickness and a flat surface within those regions of the wafer proximate the wafer edge. Instead, many wafers suffer from either edge flip in which those portions of the wafer proximate the wafer edge have a greater thickness than more medial portions of the wafer, or edge roll in which those portions of the wafer proximate the wafer edge have a reduced thickness relative to medial portions of the wafer. In either situation, the portion of the wafer proximate the wafer edge is not flat in comparison the medial portions of the wafer. Edge flip and edge roll are attributable to a variety of factors throughout the wafer fabrication process, including the polishing process in which somewhat different forces may be applied to the regions of a wafer proximate the wafer edge than the medial portions of the wafer.

Traditionally, the specifications that govern wafer fabrication provided an exclusion for an annular region of the wafer proximate the wafer edge. Within the annular region of the wafer denoted by the edge exclusion, the wafer was not required to meet all of the specifications since it was not contemplated that devices would be fabricated within this annular region. Over time, the size of the edge exclusion has been reduced as device manufacturers have begun to fabricate devices closer to the edge of the wafer. While this reduction in the edge exclusion has been advanced by the manufacturers of a wide variety of devices, the manufacturers of dynamic random access memory (DRAM) devices are among those device manufacturers that have driven the reduction in permissible edge exclusion.

With the reduction and perhaps eventual elimination of the edge exclusion, wafer manufacturers must be capable of characterizing the portion of the wafer that is proximate the wafer edge to ensure that all useful portions of the wafer meet the specifications. As such, conventional wafer inspection systems collect the same type of data for the portion of the wafer proximate the wafer edge, such as the wafer thickness and flatness, as is collected for medial portions of the wafer. However, since wafer manufacturers generally have more difficulty ensuring that the portion of the wafer proximate the wafer edge meets the specifications, wafer manufacturers would typically like to conduct a more detailed analysis of the portion of the wafer proximate the wafer edge than more medial portions of the wafer. In this regard, wafer manufacturers may desire to conduct a more detailed analysis of the portion of the wafer proximate the wafer edge in order to better characterize the wafer, such as the profile of the wafer proximate the wafer edge for the device manufacturer so that the device manufacturer can appropriately fabricate devices upon this portion of the wafer. For example, device manufacturers may be able to fabricate devices upon the portion of the wafer proximate the wafer edge even if this portion of the wafer has a slight edge flip or edge roll so long as the device manufacturer can define the profile of the wafer proximate the wafer edge with enough specificity.

Moreover, wafer manufacturers may desire to further analyze the portion of a wafer proximate the wafer edge in order to gather information that will assist the wafer manufacturer in modifying or refining the wafer fabrication process in order to remedy any problems associated with bringing the portion of the wafer proximate the wafer edge into conformity with the specifications. For example, if wafer manufacturers can determine that even though the portion of the wafer proximate the wafer edge does not meet specifications, the portion of the wafer proximate the wafer edge consistently has an edge flip of approximately the same amount, the wafer manufacturer may be able to more readily adjust the fabrication process, such as the polishing steps, in order to reduce or eliminate the edge flip and to bring subsequent wafers into conformity with the specifications.

In addition to the inspection and characterization of a wafer, it is oftentimes desirable to inspect and characterize other types of crystalline structures. For example, an epitaxial layer may be deposited upon a wafer prior to device fabrication. Since an epitaxial layer is generally deposited upon a wafer, the epitaxial layer may exhibit the same variations in shape, particularly about the edge of the wafer, as presented by the underlying wafer. Although less pronounced that a wafer, an epitaxial layer may also have slight variations in thickness For the reasons described above in conjunction with a wafer, it would be desirable to inspect other types of crystalline structures, such as epitaxial layers, particularly about the edge thereof.

SUMMARY OF THE INVENTION

Methods and computer program products for analyzing a crystalline structure, such as a wafer, an epitaxial layer or the like, in more detail, including the portion of the crystalline structure proximate the edge, are provided. Among other things, the methods and computer program products of certain embodiments of the present invention determine the average thickness and the normalized profile of a crystalline structure in more detail than conventional techniques. Additionally, the method and computer program product of other embodiments of the present invention represent the profile proximate the edge of a crystalline structure with a pair of lines that are selected to permit the profile of the crystalline structure proximate the edge of the crystalline structure to be characterized in more detail. Further, the method of yet another embodiment of the present invention permits the average edge profile for a plurality of crystalline structures to be defined.

According to one aspect of the present invention, a method and computer program product for analyzing a crystalline structure are provided which includes the determination of an average thickness of the crystalline structure. According to this aspect, data representative of thickness is obtained at a plurality of different angular positions for each of a plurality of different radial locations on the crystalline structure. For each of the different radial locations on the crystalline structure, the average thickness is determined. In this regard, the average thickness for a respective radial location is determined based upon the data representative of thickness of the crystalline structure at the plurality of different angular positions for the respective radial location. The method and computer program product of this aspect of the present invention may then graphically depict the average thickness for each of the different radial locations on the crystalline structure. By basing the average thickness at each of the different radial locations upon an average of the thickness at a plurality of different angular positions for each respective radial location, the results provide more meaningful or substantive information about the thickness of the crystalline structure than that provided by conventional techniques.

Based upon the thickness at each of a plurality of different radial locations on the crystalline structure, the methods and computer program products according to another aspect of the present invention implement a number of algorithms to define the normalized shape of the crystalline structure. In this regard, a reference line is defined to represent a relationship between the thickness of the crystalline structure and radial location. Typically, the thickness of the crystalline structure for at least some of the radial locations is adjusted to at least partially compensate for taper across the crystalline structure, thereby defining an adjusted relationship between thickness of the crystalline structure and radial location. As such, the reference line is generally based upon this adjusted relationship. Based upon deviations in the adjusted thickness from the reference line at for each of several different radial locations, the normalized profile of the crystalline structure may be determined. The normalized profile of the crystalline structure at different radial locations on the crystalline structure may then be graphically depicted in order to provide additional information. Among other things, this technique for defining the normalized profile of a crystalline structure can be utilized to identify or otherwise predict those features of the crystalline structure for which compensation cannot be provided by the device field focusing algorithms utilized by a device manufacturer.

According to yet another aspect of the present invention, methods and computer program products are provided for representing the profile proximate an edge of the crystalline structure. In this regard, the thickness is initially determined for each of a plurality of different radial locations on the crystalline structure. First and second lines are then defined that are at least partially based upon the thickness across at least somewhat different regions proximate the edge of the crystalline structure. In particular, the first line is defined based at least partially upon the thickness across a respective region that includes at least one radial location that is positioned closer to the edge of the crystalline structure than the respective region upon which the second line is based. Similarly, the second line is defined so as to be based at least partially upon the thickness across a respective region that includes at least one radial location that is positioned further from the edge of the crystalline structure, i.e., more toward the center of the crystalline structure, than the respective region upon which the first line is based. As such, the first and second lines cooperate to at least partially represent the relative differences in the interior geometry and the profile of the crystalline structure proximate the edge of the crystalline structure. The first and second lines may be graphically depicted to at least partially represent the relative differences in the interior geometry and the profile proximate the edge of the crystalline structure.

The regions upon which the first and second lines are based may be separate or may overlap. In one embodiment, for example, the first and second lines are defined so as to be based at least partially upon the thickness across mutually exclusive regions proximate the edge of the crystalline structure. In another embodiment, however, the first and second lines are defined to be based at least partially upon the thickness across partially overlapping regions proximate the edge of the crystalline structure.

The first and second lines may be based upon the thickness across the respective regions of the crystalline structure. The thickness may be the average thickness for each of a plurality of different radial locations across the respective regions. As described in conjunction with another aspect of the present invention, the average thickness for a respective radial location is the average thickness at a plurality of different angular positions for the respective radial location. Alternatively, the first and second lines may be based upon the normalized profile of the crystalline structure across the respective regions since the normalized profile of the crystalline structure is, in turn, based upon the thickness across the respective regions.

Based upon the definition of the first and second lines, the method and computer program product of this aspect of the present invention permit various parameters which at least partially characterize the profile of the crystalline structure proximate the edge of the crystalline structure to be determined. For example, the angle $\theta$ defined between the first and second lines may be determined. In addition, the distance $\Delta$ between the first and second lines may be determined at a predetermined point along the line. For example, the distance $\Delta$ between the first and second lines may be determined at a point coincident with the outermost radial location at which the thickness was determined. In addition, a respective slope b for each of the first and second lines may be determined. In addition, the respective value a for each of the first and second lines at the center of the crystalline structure may be determined. Based upon these parameters, the profile of the crystalline structure proximate the edge of the crystalline structure is further characterized.

According to yet another aspect of the present invention, a method for defining the average edge profile, such as average edge roll, for a plurality of crystalline structure is provided. In order to define the average edge profile, the average thickness of a crystalline structure at a plurality of different angular positions is separately determined by determining the average thickness at a respective angular position for at least first and second radial locations proximate an edge of the plurality of crystalline structures. Once the average thickness has been determined, the average edge profile at the different angular positions is determined for the plurality of crystalline structures based at least partially upon the difference between the average thickness at the first radial location for the plurality of crystalline structures and the average thickness at the second radial location for the plurality of crystalline structures at each of the different angular positions. The average edge profile may then be graphically depicted at the different angular positions. As such, the method of this aspect of the present invention provides additional detail regarding the portion of a crystalline structure proximate its edge.

BRIEF DESCRIPTION OF THE DRAWINGS

Figure 1:
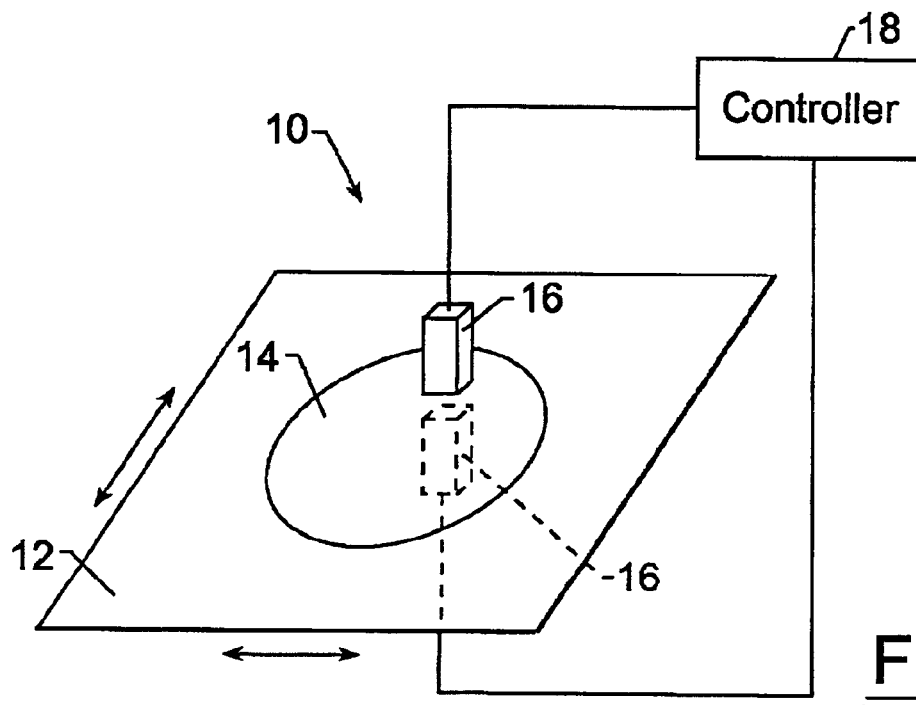
Figure 2:
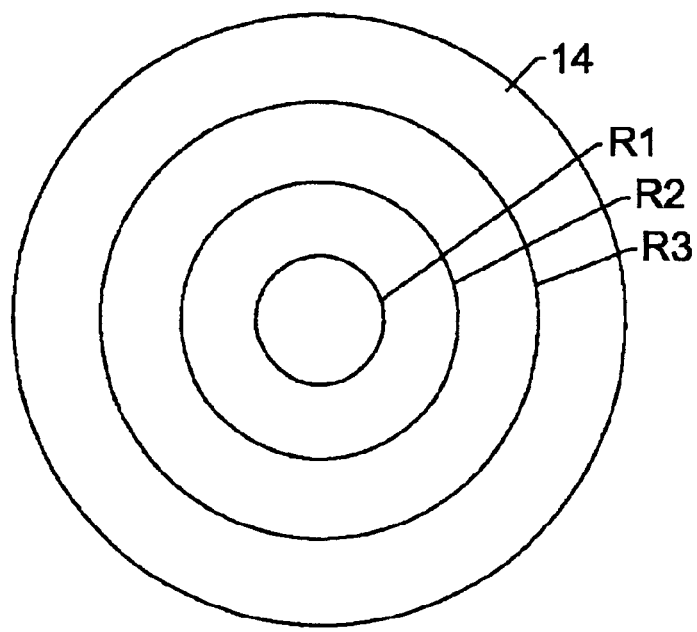
Figure 3:
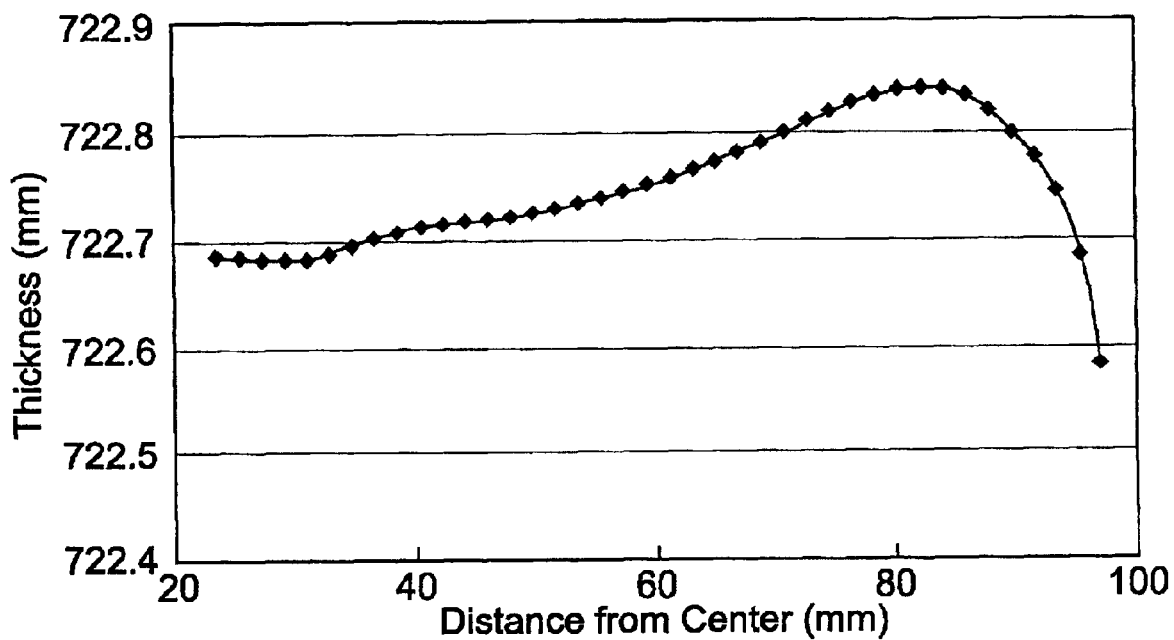
Figure 4:
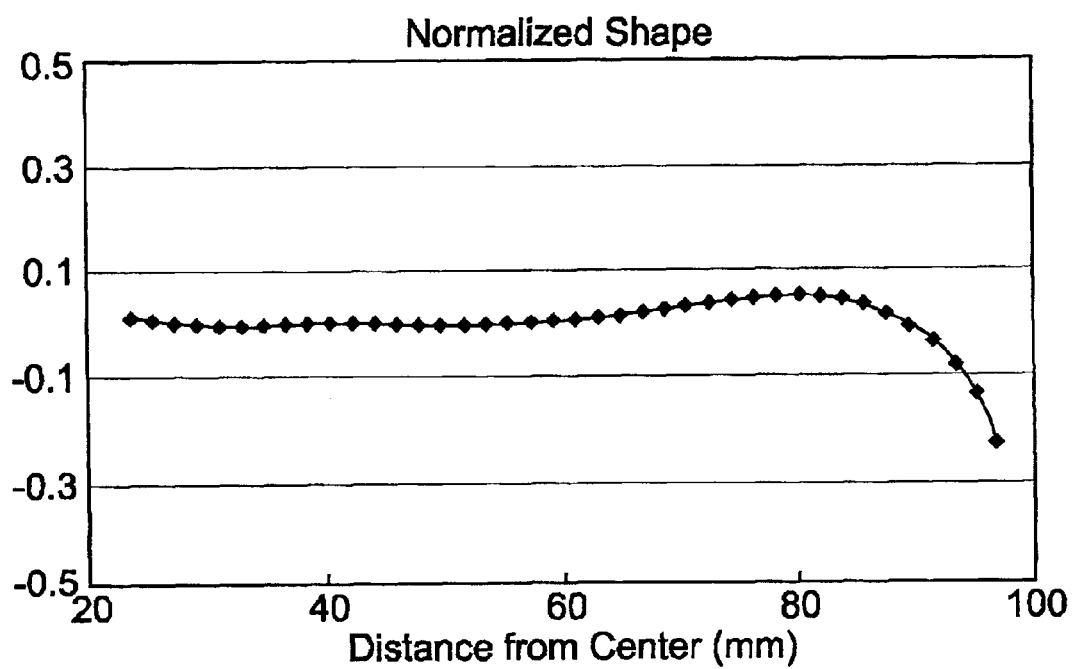
Figure 5:
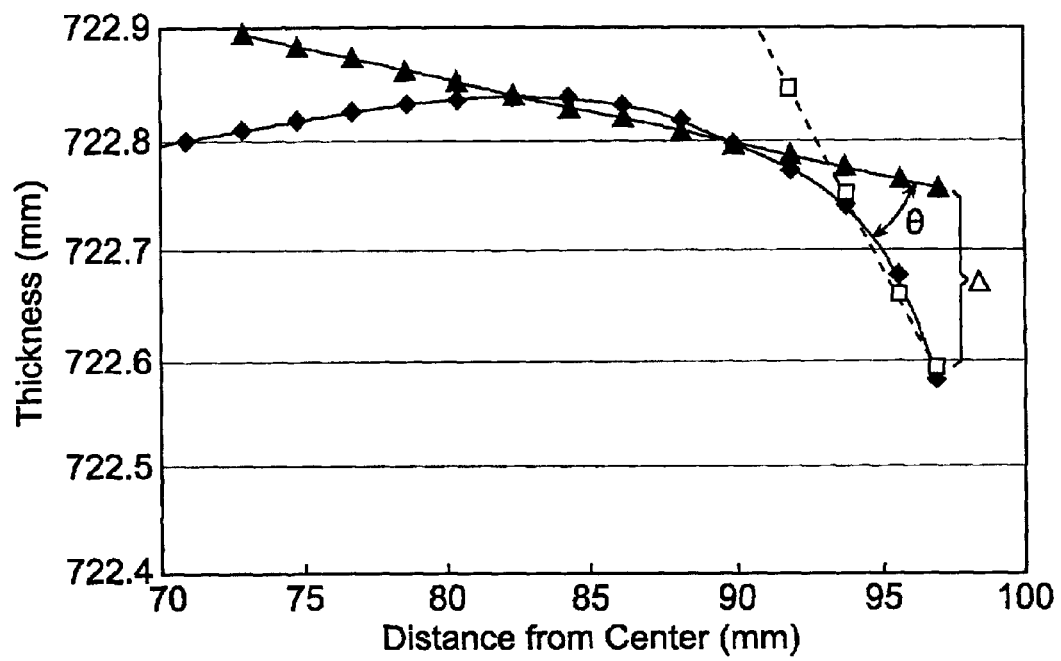
Figure 6:
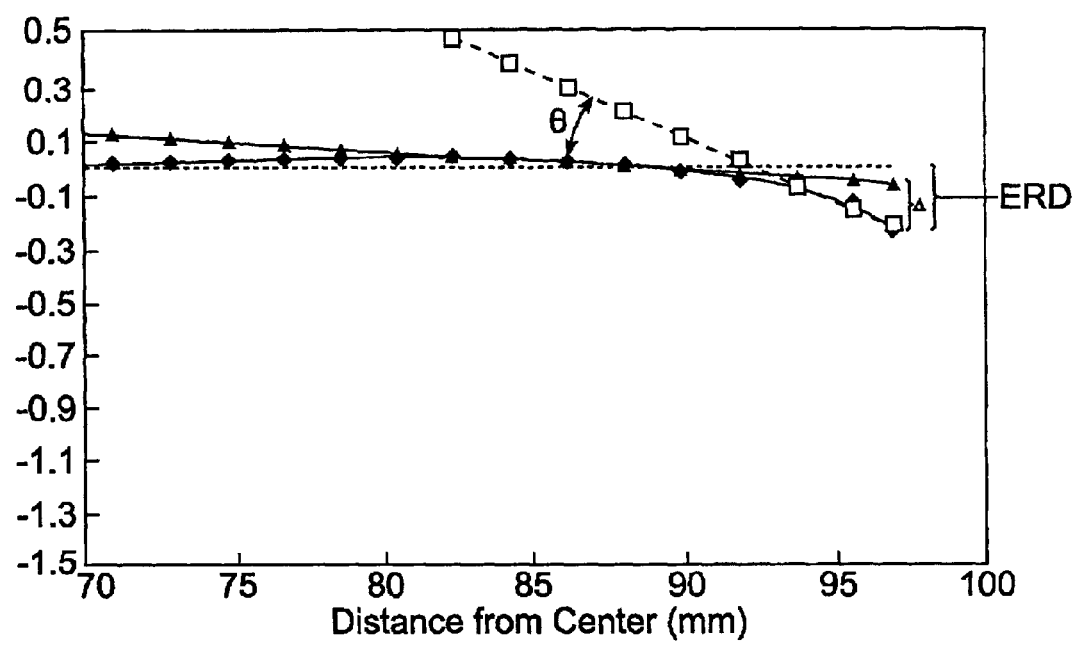
Figure 7:
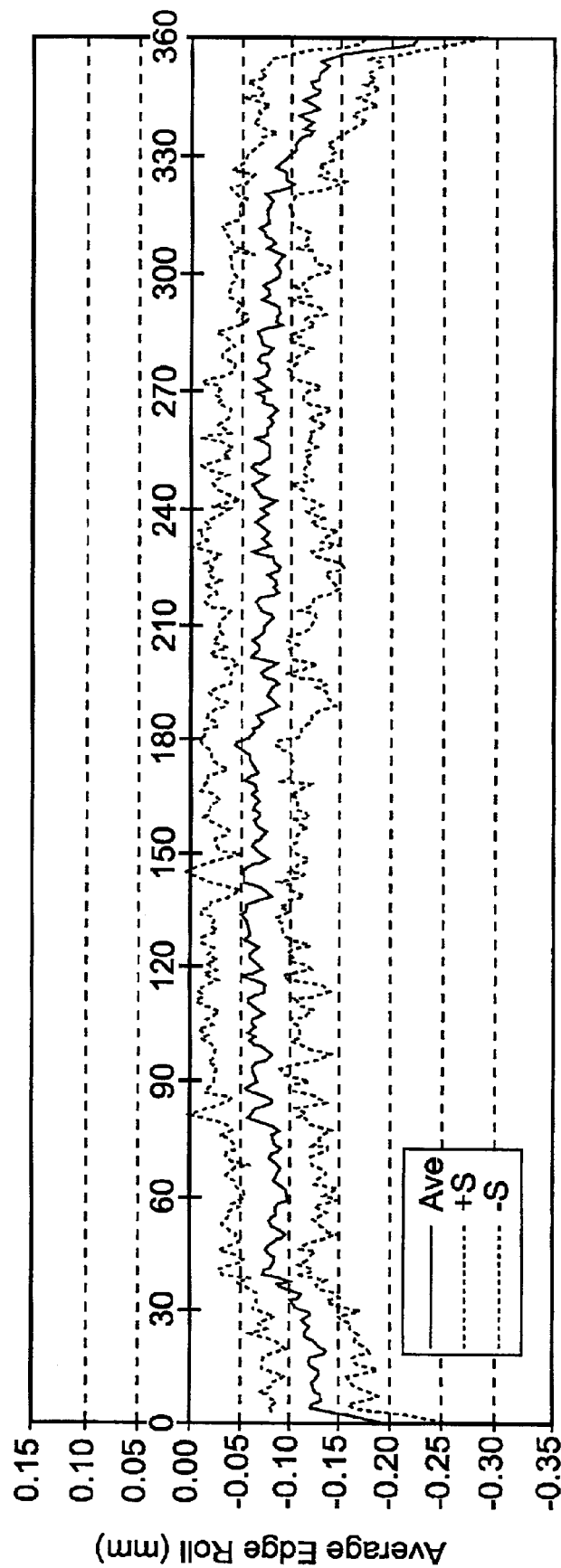

Having thus described the invention in general terms, reference will now be made to the accompanying drawings, which are not necessarily drawn to scale, and wherein:

FIG. 1 is a schematic representation of a wafer inspection station;

FIG. 2 depicts a wafer on which three concentric circles are drawn to illustrate three different radial locations at which data is collected;

FIG. 3 is a graphical depiction of the wafer thickness at a plurality of radial locations produced according to one embodiment of the present invention;

FIG. 4 is a graphical depiction of the normalized profile of a wafer produced according to one embodiment of the present invention;

FIG. 5 is a graphical depiction of two lines that are constructed based upon the thickness of edge portions of a wafer according to one embodiment of the present invention in order to provide additional information about the wafer edge;

FIG. 6 is a graphical depiction of two lines that are constructed based upon the normalized shape of edge portions of a wafer according to one embodiment of the present invention in order to provide additional information about the wafer edge; and FIG. 7 is a graphical depiction of the edge profile of a wafer at different angular positions produced according to one embodiment of the present invention.

DETAILED DESCRIPTION OF THE PREFERRED EMBODIMENTS

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

The methods and computer program products of the present invention permit a more detailed analysis of a crystalline structure including, for example, a more detailed characterization of the portion of the crystalline structure proximate the its edge. The methods and computer program products will be primarily described hereinbelow in conjunction with the inspection, analysis and characterization of wafer. However, the methods and computer program products can be utilized to inspect, analyze and characterize other crystalline structures, such as epitaxial layers and the like.

For a wafer, the more detailed analysis is generally based upon data provided by a wafer inspection system. A variety of wafer inspection systems are commercially available from ADE Corporation and others including NewCreation Co., Ltd. of Komae, Japan which offers an inspection system bearing Model No. NII-800FL. For example, ADE Corporation provides a variety of wafer inspection systems including the ADE UltraGage™, UltraScan™, MicroScan® and WaferCheck® systems. In embodiments in which the methods and computer program products will inspect, analyze and characterize other crystalline structures, the data may be provided by another conventional type of inspection system. For example, in the embodiment in which the methods and computer program products will inspect, analyze and characterize an epitaxial layer, the data may be provided by Fourier Transform Infrared (FTIR) spectroscopy, such as provided by an FTIR system provided by Accent Optical Technologies of Cambridge, Mass. bearing Model No. QS400.

By way of example, a conventional wafer inspection system 10 includes a platform 12 upon which a wafer 14 is mounted, as shown in FIG. 1. A wafer inspection system also generally includes a pair of capacitive probes 16 positioned on opposite sides of the wafer. As indicated by the arrows in FIG. 1, the platform of the wafer inspection system of this exemplary embodiment may be capable of movement such that the probes may be controllably positioned over any portion of the wafer even though the probes remain stationary. The wafer inspection system also includes a computer or other type of controller 18 for controllably positioning the probes and the platform with respect to one another and for collecting and analyzing the data obtained by the probe. In this regard, the platform is generally moved relative to the probes in a predetermined pattern so that the probes are sequentially positioned in tandem over a number of different locations across the surface of the wafer. As such, the probes can obtain data at each of these locations that define some aspect of the wafer at the respective location. For example, the data collected by the probes is typically a measure of the capacitance which, in turn, can be utilized to define the thickness of the wafer at the respective location.

Based upon this data, a conventional wafer inspection system 10 can determine the thickness of the wafer 14 at the plurality of different wafer locations. Based upon the wafer thickness and a reference plane constructed to represent the lower or rear surface of the wafer, i.e., the surface of the wafer contacting the platform 12, a conventional wafer inspection system can also determine the flatness and shape of the upper surface of the wafer upon which devices will subsequently be formed. According to the methods and computer program products of the present invention, however, a more detailed analysis of the wafer including, in particular, the portion of the wafer proximate the wafer edge is provided.

According to the present invention, the data representative of wafer thickness at a plurality of different angular positions for each of a plurality of different radial locations on the wafer is further analyzed in order to determine the average wafer thickness for each of the different radial locations on the wafer. In this regard, the average wafer thickness for a respective radial location is determined based upon the data representative of wafer thickness at the plurality of different angular positions for the respective radial location. For purposes of illustration, three concentric circles (designated R1, R2 and R3) are depicted on the wafer 14 of FIG. 2 to illustrate three different radial locations on the wafer. Data would therefore be collected at a number of points about each concentric circle such that the wafer can be analyzed at a number of different angular positions for each radial location of interest.

By way of example, a wafer inspection station 10 may measure the wafer thickness at the center of the wafer and at a plurality of different radial locations spaced apart by 1 mm. For a wafer having a diameter of 200 mm, the wafer inspection system of this example would determine the wafer thickness at the center of the wafer and at radial locations spaced 1 mm, 2 mm, 3 mm, . . . 0.98 mm and 99 mm from the center of the wafer. For each radial location, the wafer inspection system of this example determines the wafer thickness at a number of different angular positions. As known to those skilled in the art, each of these angular positions are generally defined with reference to a notch or flat at a specific crystallographic orientation along the edge of the wafer. The angular position defined by the notch or flat is generally identified as 0° or 360°, and the other angular positions are defined relative thereto. As such, the wafer inspection system of this example may measure the wafer thickness at a respective radial location at 1° increments for a total of 360 different angular positions. For a respective radial location, the wafer inspection system of this example would therefore measure the wafer thickness at 0°, 1°, 2°, 3°, . . . 358° and 359°, thereby measuring 360 points, a concentric circle, on a wafer. According to this aspect of the current invention, the average wafer thickness for a respective radial location is determined to be the average wafer thickness at the plurality of different angular positions at which wafer thickness is determined for the respective radial location. In the foregoing example, the average wafer thickness at each radial location would be the average of the wafer thickness values measured at each angular position, such as 0°, 1°, 2°, . . . 358° and 359°.

As shown in FIG. 3, the method of this aspect of the present invention may also graphically depict the average wafer thickness for each of the plurality of different radial locations on the wafer. As described, each point on the graphical depiction of the average wafer thickness represents the average of the wafer thickness values measured at the plurality of different angular locations for the respective radial location. Accordingly, the average wafer thickness that is determined according to this method of the present invention provides a significant amount of information which permits a wafer manufacturer and/or a device manufacturer to properly characterize a wafer. In this regard, the average wafer thickness determined according to this aspect of the present invention provides substantially more information in a summarized form than that provided by conventional wafer inspection systems since each point on the graphical depiction of the average wafer thickness represents the average of the wafer thickness values measured at a plurality of angular positions for a respective radial location. Thus, the average wafer thickness determined according to this aspect of the present invention permits the wafer manufacturer and/or device manufacturer to determine those radial portions of a wafer which, on average, fail to meet specifications or correspond with similarly distributed device yield or performance phenomenon.

Based upon the wafer thickness, the normalized profile of a wafer may be determined according to the method and computer program product of another aspect of the present invention. In this regard, the wafer thickness for each of a plurality of different radial locations on the wafer is determined. As described above, the wafer thickness for the plurality of different radial positions on the wafer may be determined to be the average wafer thickness for a plurality of different angular positions for a respective radial location. However, the wafer thickness at the plurality of different radial locations on the wafer may be determined in other manners and may not represent the average wafer thickness across a plurality of different angular locations.

Regardless of the manner in which the wafer thickness is determined, a reference line is defined to represent the relationship between the wafer thickness and radial location. This reference line is generally defined to be the line that best fits the wafer thickness values for the various radial locations of the wafer, such as based upon a least squares criterion. Typically, the reference line is linear. However, the reference line may be a predefined type of curve, such as a second or third order curve, if so desired. For purposes of explanation and illustration, however, the method and computer program product of this aspect of the present invention will be described to construct a linear reference line.

The reference line that represents the relationship between wafer thickness and radial location is generally adjusted for at least some of the radial locations to at least partially compensate for taper across the wafer. In this regard, wafers oftentimes have a gradual taper such that the center of the wafer is slightly thinner than outer portions of the wafer. As such, the slope of the reference line that is initially constructed is typically a measure of the taper of a wafer. In order to compensate for taper, the reference line may therefore be adjusted so as to have a slope of zero in order to provide an approximation of the wafer thickness in the absence of taper. In the process of adjusting the reference line to have a slope of zero, the wafer thickness for the various radial locations as represented by the reference line is adjusted to effectively remove the effects of the taper across the surface of the wafer. Thus, if the reference line was adjusted by a certain amount at a respective radial location to remove the effects of taper, the wafer thickness value at the respective radial location is also adjusted by the same amount. Accordingly, the adjusted wafer thickness values represent the thickness of the wafer at respective radial locations once the effects of taper have been removed. Alternatively, the wafer thickness for the radial locations that experience taper may by adjusted to compensate for taper prior to constructing the reference line. In any event, the resulting reference line preferably represents the average thickness of the wafer following compensation for wafer taper.

Based upon the reference line, the normalized profile of the wafer is then determined. In this regard, the deviation in the adjusted wafer thickness, i.e., the wafer thickness after adjustments to compensate for taper, from the reference line (also following adjustment for taper) is determined for each of the plurality of different radial locations on the wafer. As such, at each different radial location, the difference between the adjusted wafer thickness and the corresponding point along the reference line is determined. This difference at each different radial location then defines the normalized profile of the wafer. The normalized profile of the wafer may be graphically depicted as shown in FIG. 4. Based upon the normalized profile, including the graphical representation of the normalized profile, of the wafer, the wafer manufacturer and/or the device manufacturer may readily determine if a wafer has the desired profile and, if not, can quickly ascertain those portions of the wafer which fail to have the requisite profile.

In those instances in which the normalized profile is based upon an average wafer thickness at each of the different radial locations that, in turn, represents the average of the wafer thickness at a plurality of different angular positions for the respective radial locations, the resulting normalized profile of the wafer includes significantly more information than the profile data provided by conventional wafer inspection systems. Moreover, the normalization of the profile permits the profile of the wafer to be readily analyzed to determine its compliance or non-compliance with the specifications. By basing the normalized profile upon wafer thicknesses that have been compensated for taper across the wafer assists in the review of the normalized profile since many device manufacturers have developed fabrications processes that already take into account the anticipated taper of the wafer since taper is a consistent feature of most wafers. Accordingly, wafer manufacturers and/or device manufacturers are generally only concerned about those deviations in the profile of a wafer that are unanticipated and therefore result in a deviation from the anticipated taper of the wafer. Thus, the compensation of the wafer thicknesses for taper does not diminish the usefulness of the resulting normalized profile, but, instead, permits a wafer manufacturer and/or device manufacturer to more readily determine if the profile of the wafer includes any unanticipated variations from the desired profile.

The profile of the wafer may be determined in other manners if desired. For example, a best fit plane may be defined based upon the wafer thickness at a number of points within a central region of the wafer. For example, the best fit plane may be defined based upon the wafer thickness measured at a number of different angular positions at each of a number of different radial locations from the center of the wafer to an intermediate radial location, i.e., a radial location spaced from both the center of the wafer and the edge of the wafer, such as the radial location spaced 70 mm from the center of a wafer having a diameter of 200 mm. Based on a comparison of this best fit plane to the actual profile of the wafer as described above, the profile of the wafer, i.e., concave or convex, and the magnitude and type/direction of edge taper may be readily determined.

According to another aspect of the present invention, the wafer thickness at a plurality of different radial locations on a wafer may be further analyzed to represent the wafer profile proximate an edge of the wafer. In this regard, the wafer thickness at each of the different radial locations on the wafer is generally the average wafer thickness at each of the different radial locations on the wafer, with the average wafer thickness for a respective radial location being the average of the wafer thickness at a number of different angular positions for the respective radial location as described above. However, the wafer thickness at each of the different radial locations on the wafer may not be the average wafer thickness, but may be the wafer thickness at a particular angular position or may be determined in some other manner, if so desired.

Regardless of the manner in which the wafer thickness is determined for each of the different radial locations across the wafer, the method and computer program product of this aspect of the present invention define first and second lines that are each at least partially based upon the wafer thickness across at least partially different regions proximate the edge of the wafer. In this regard, the first and second lines may be based at least partially upon the wafer thickness across mutually exclusive, i.e., different, regions proximate the edge of the wafer. Typically, these mutually exclusive regions would be proximate one another, but these mutually exclusive regions could be spaced radially apart if so desired. Alternatively, the first and second lines may be based at least partially upon the wafer thickness across partially overlapping regions proximate the edge of the wafer. In this situation, the first and second lines are based upon respective regions that include some of the same radial locations, but that also include some different radial locations.

The first line is based at least partially upon the wafer thickness across a respective region that includes at least one radial location that is positioned closer to the edge of the wafer than the respective region upon which the second line is based. Similarly, the second line is based at least partially upon the wafer thickness across a respective region that includes at least one radial location that is positioned further from the edge of the wafer and, therefore, closer to the center of the wafer than the respective region upon which the first line is based. Typically, the region of the wafer upon which the first line is based includes the outermost radial locations for which data representative of the wafer thickness is collected and the region upon which the second line is based is positioned radially inward from the region upon which the first line was based, either in an adjacent or partially overlapping relationship. However, the respective regions upon which the first and second lines are based may be positioned somewhat further from the edge of the wafer, if desired. Typically, the regions of the wafer that are represented by the first and second lines are selected to include at least the inflection point of the edge shape feature that is desirably characterized and quantified. Moreover, the regions of the wafer that are represented by the first and second lines may also be selected based upon the specifications of the device manufacturer, including the device field size and the partial site leveling techniques employed by the photolithography techniques of the device manufacturer, to insure that those regions of interest to the device manufacturer are being characterized.

As illustrated in FIG. 5, the first and second lines may be defined based upon the wafer thickness, such as the average wafer thickness (illustrated by the curve denoted with diamonds), across at least partially different regions proximate the edge of the wafer. Alternatively, the first and second lines may be defined based upon the profile of the wafer and, in particular, the normalized profile of the wafer across at least partially different regions proximate the edge of the wafer, as shown in FIG. 6. As will be recognized, even in instances in which the first and second lines are based upon the normalized profile of the wafer, the first and second lines are at least partially based upon the wafer thickness since the normalized profile is constructed based upon the wafer thickness as described above.

By way of example, FIGS. 5 and 6 depict first and second lines which are based upon the wafer thickness in mutually exclusive regions proximate the edge of the wafer. In particular, the first line (denoted by squares) is based upon the wafer thickness within the region of the wafer that includes the three outermost radial locations for which measurements of the wafer thickness are obtained. The second line of this example (denoted by triangles) is based upon the wafer thickness within the region of the wafer that includes the next seven radial locations for which measurements of the wafer thickness are obtained that are radially inward from those included within the region upon which the first line is based. As such, if the radial locations for which the wafer thickness is measured are designated 1, 2, 3, . . . in a direction extending from the edge of the wafer toward the center of the wafer such that radial location 1 is the outermost radial location for which wafer thickness data is obtained, the first and second lines are based upon the wafer thickness within regions that include radial locations 1–3 and 4–10, respectively.

Within each region, the first and second lines are generally defined as the line which best fits the wafer thickness values within the respective region. As shown in FIGS. 5 and 6, the first and second lines are generally linear functions. However, the first and second lines may be curved lines of the second, third or other predefined order if so desired. Based upon the first and second lines, various parameters may be determined which are useful in characterizing the wafer profile proximate the edge of the wafer. In this regard, the angle θ defined between the first and second lines as shown in FIGS. 5 and 6 may be determined. Likewise, the distance Δ between the first and second lines at a predetermined point along the lines may be determined. While the predetermined point along the lines may be defined in different manners, the distance Δ is typically measured between the first and second lines at a point coincident with the outermost radial location at which the wafer thickness was determined, i.e., at the right-most point on the graphs depicted in FIGS. 5 and 6, which, in turn, is representative of radial location 1 as described above. In addition, the respective slope b of each of the lines may be determined as well as the value a of the first and second lines at the center of the wafer. Based upon these parameters, the profile of the edge of the wafer may be further characterized.

For example, the angle θ and the distance Δ provide a measure of the edge roll or edge flip with a larger angle θ and a larger distance Δ representing a more pronounced edge roll or edge flip and a smaller angle θ and a smaller distance Δ representing a less pronounced edge roll or edge flip. In addition, the slope b of the lines identifies if the deviation in wafer thickness proximate the wafer edge constitutes edge roll or edge flip. For example, lines, particularly a first line, having a positive slope b indicates edge flip, while lines, again particularly a first line, having a negative slope b indicates edge roll. In addition, the ratio of the slopes of the first line to the slope of the second line, i.e., $b_1/b_2$, can be utilized to characterize the severity of the inflection of the edge feature with a ratio of unity representing a wafer edge with a linear slope without inflection, and ratios of greater or less than 1 representing a wafer edge having a slope that varies at an inflection point proximate the edge.

The method of the present invention may also characterize the edge of a wafer based upon its edge roll deviation (ERD). ERD is generally defined as the vertical difference between a base line, such as the dashed line y=0 in FIG. 6, and a point on the surface of the wafer. As indicated in FIG. 6, ERD may be defined as the difference between the base line and the radially outwardmost point on the surface of the wafer that has been measured. However, ERD may be determined with respect to other points on the surface of the wafer that are further from the edge. The sign of the ERD will determine the type of edge profile, such as edge roll or edge flip, while the magnitude of the ERD will determine degree of edge roll or edge flip.

According to another aspect of the present invention, a method for defining the average edge profile, such as the average edge roll, for a plurality of wafers is provided. According to this aspect of the present invention, the average wafer thickness for a group, or lot, of wafers is determined at a plurality of different angular positions for each of a plurality of different radial locations across the plurality of wafers. By way of example, the average wafer thickness for a respective angular position is determined to be the average of the wafer thickness at each of the different radial locations at the respective angular position, not just for a single wafer, but for a plurality of wafers. In a set often wafers, for example, the average wafer thickness at 0° would be determined based upon the average of the wafer thickness for each radial location for which wafer thickness data is collected for each of the ten wafers at 0°.

The average edge profile is then determined at each of the plurality of different angular positions. For each different angular position, the average edge profile is based at least partially upon a difference between the average wafer thickness at two different radial locations proximate the wafer edge. For each radial location, the average wafer thickness represents the average wafer thickness for each of the plurality of wafers at the respective angular position and radial location. In one embodiment, the average edge profile, i.e., the average edge roll, at a respective angular position is equal to the difference between the average wafer thickness at a first radial location proximate the wafer edge and a second radial location somewhat further removed from the wafer edge, i.e., closer to the center of the wafer. Typically, the first radial location is the outermost radial location for which wafer thickness data is obtained, while the second radial location is radially inward from and immediately adjacent to the first radial location. For example, for a wafer having a diameter of 200 mm with the wafer thickness measured at a plurality of radial locations spaced apart by about 5 mm, the first radial location may be located at a radial distance of 95.7 mm from the center of the wafer and the second radial location may be located at a radial location of 90.9 mm from the center of the wafer. However, the method of this aspect of the present invention may determine the average edge roll based upon the average wafer thickness at other radial locations if so desired. In addition, the method of this aspect of the present invention may determine several different average edge rolls, if desired, by determining the average edge roll between each of several different pairs of radial locations.

In addition, the average edge shape for each of the different angular positions plus the standard deviation (designated +S) and minus the standard deviation (designated −S) may also be depicted for reference purposes as shown in FIG. 7. Based upon the average edge shape for a plurality of wafers, and the variability of that shape, the wafer manufacturer can readily determine if the wafers generally have an acceptable or unacceptable edge shape relative to the specifications set forth by the device manufacturers.

Although the methods of the present invention may be performed manually, the methods are generally performed by a computer analysis system that includes a computer, a processor or other data processing circuitry that operates under software control embodied in a computer program product. Not only does the computer program product direct the computer, processor or the like to perform the desired analysis of the data provided by a wafer inspection station 10, but the computer program product may also drive a display and/or a printer associated with the computer, processor or the like for graphically depicting the various parameters.

More particularly with respect to the computer program product, the computer program product includes a computer-readable storage medium, such as the non-volatile storage medium, and computer-readable program instructions, embodied in the computer-readable storage medium. These computer program instructions may be loaded onto a computer or other programmable apparatus to produce a machine, such that the instructions which execute on the computer or other programmable apparatus create means for implementing the various functions described above. These computer program instructions may also be stored in a computer-readable memory that can direct a computer or other programmable apparatus to function in a particular manner, such that the instructions stored in the computer-readable memory produce an article of manufacture including instruction means which implement the functions described above. The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions described above.

Many modifications and other embodiments of the invention will come to mind to one skilled in the art to which this invention pertains having the benefit of the teachings presented in the foregoing descriptions and the associated drawings. As described above, the methods and computer program products may be utilized to inspect, analyze and characterize a variety of crystalline structures in addition to wafers, including epitaxial layers and the like. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method of analyzing a crystalline structure comprising:
    obtaining data representative of a thickness of the crystalline structure at a plurality of different angular positions for each of a plurality of different radial locations on the crystalline structure;
    determining an average thickness for each of the plurality of different radial locations on the crystalline structure, wherein determining the average thickness for a respective radial location comprises determining the average thickness based upon the data representative of thickness at the plurality of different angular positions for the respective radial location; and
    determining a normalized profile of the crystalline structure based upon the average thickness for each of the plurality of different radial locations.

2. A method according to claim 1 wherein determining the normalized profile of the crystalline structure comprises:
    defining a reference line to represent a relationship between the thickness of the crystalline structure and radial location; and
    determining the normalized profile of the crystalline structure based at least partially upon deviations in the thickness of the crystalline structure from the reference line for each of a plurality of different radial locations on the crystalline structure.

3. A method according to claim 2 wherein defining the reference line comprises adjusting the thickness crystalline structure for at least some of the different radial locations to at least partially compensate for taper across the crystalline structure such that the reference line represents the adjusted relationship between thickness and radial location, and wherein determining the normalized profile of the crystalline structure comprises determining the normalized profile of the crystalline structure based upon deviations in the adjusted thickness from the reference line for each of a plurality of different radial locations on the crystalline structure.

4. A method according to claim 1 further comprising graphically depicting the normalized profile of the crystalline structure at the plurality of different radial locations on the crystalline structure.

5. A method of analyzing a crystalline structure comprising:
    obtaining data representative of a thickness of the crystalline structure at a plurality of different angular positions for each of a plurality of different radial locations on the crystalline structure;
    determining an average thickness for each of the plurality of different radial locations on the crystalline structure, wherein determining the average thickness for a respective radial location comprises determining the average thickness based upon the data representative of thickness at the plurality of different angular positions for the respective radial location; and
    graphically depicting the average thickness for each of the plurality of different radial locations on the crystalline structure.

6. A method of defining a normalized shape of a crystalline structure comprising:
    determining a thickness for each of a plurality of different radial locations on the crystalline structure;
    defining a reference line to represent a relationship between thickness and radial location, wherein defining the reference line comprises adjusting the thickness for at least some of the different radial locations to at least partially compensate for taper across the crystalline structure such that the reference line represents the adjusted relationship between thickness and radial location; and
    determining the normalized profile of the crystalline structure based upon deviations in the adjusted thickness from the reference line for each of a plurality of different radial locations on the crystalline structure.

7. A method according to claim 6 wherein determining thickness of the crystalline structure comprises determining an average thickness for each of the plurality of different radial locations on the crystalline structure, wherein determining the average thickness for a respective radial location comprises determining the average thickness based upon the thickness of the crystalline structure at a plurality of different angular positions for the respective radial location.

8. A method according to claim 6 further comprising graphically depicting the normalized profile of the crystalline structure at the plurality of different radial locations on the crystalline structure.

9. A computer program product for defining a normalized profile of a crystalline structure, wherein the computer program product comprises a computer-readable storage medium having computer-readable program instructions embodied in said medium, said computer-readable program instructions comprising:
    first computer-readable program instructions for determining a thickness of a crystalline structure for each of a plurality of different radial locations on the crystalline structure;
    second computer-readable program instructions for defining a reference line to represent a relationship between thickness of the crystalline structure and radial location, wherein said second computer-readable program instructions comprises computer-readable program instructions for adjusting the thickness for at least some of the different radial locations to at least partially compensate for taper across the crystalline structure such that the reference line represents the adjusted relationship between thickness and radial location; and third computer-readable program instructions for determining the normalized profile of the crystalline structure based upon deviations in the adjusted thickness from the reference line for each of a plurality of different radial locations on the crystalline structure.

10. A computer program product according to claim 9 wherein said first computer-readable program instructions determine an average thickness for each of the plurality of different radial locations on the crystalline structure, and wherein said first computer-readable program instructions determine the average thickness for a respective radial location by determining the average thickness based upon the thickness of the crystalline structure at a plurality of different angular positions for the respective radial location.

11. A computer program product according to claim 9 further comprising fourth computer-readable program instructions for graphically depicting the normalized profile of the wafer at the plurality of different radial locations on the crystalline structure.

12. A method of representing a shape of a crystalline structure proximate an edge of the crystalline structure comprising:

determining a thickness for each of a plurality of different radial locations on the crystalline structure;

defining first and second lines at least partially based upon the thickness across at least partially different regions proximate the edge of the crystalline structure, wherein defining the first and second lines comprises defining the first line based at least partially upon the thickness across a respective region that includes at least one radial location that is positioned closer to the edge of the crystalline structure than the respective region upon which the second line is based, wherein defining the first and second lines further comprises defining the second line based at least partially upon the thickness across a respective region that includes at least one radial location that is positioned further from the edge of the crystalline structure than the respective region upon which the first line is based, and wherein the first and second lines cooperate to at least partially represent the profile of the crystalline structure proximate the edge of the crystalline structure; and determining a parameter selected from the group consisting of an angle θ defined between the first and second lines, a respective slope of each of the first and second lines, and an edge roll deviation of the crystalline structure.

13. A method according to claim 12 wherein defining the first and second lines comprises defining the first and second lines based at least partially upon the thickness across mutually exclusive regions proximate the edge of the crystalline structure.

14. A method according to claim 12 further comprising determining a distance Δ between the first and second lines at a predetermined point along the lines.

15. A method according to claim 14 wherein determining the distance Δ comprises determining the distance Δ between the first and second lines at a point coincident with the outermost radial location at which the thickness of the crystalline structure was determined.

16. A method according to claim 12 further comprising determining a respective value a for each of the first and second lines at a center of the wafer.

17. A method according to claim 12 wherein determining the thickness of the crystalline structure comprises determining an average thickness for each of the plurality of different radial locations on the crystalline structure, wherein determining the average wafer thickness for a respective radial location comprises determining the average thickness based upon the thickness at a plurality of different angular positions for the respective radial location.

18. A method of representing a shape of a crystalline structure proximate an edge of the crystalline structure comprising:

determining a thickness for each of a plurality of different radial locations on the crystalline structure; and defining first and second lines based at least partially upon the thickness across partially overlapping regions proximate the edge of the crystalline structure, wherein defining the first and second lines comprises defining the first line based at least partially upon the thickness across a respective region that includes at least one radial location that is positioned closer to the edge of the crystalline structure than the respective region upon which the second line is based, wherein defining the first and second lines further comprises defining the second line based at least partially upon the thickness across a respective region that includes at least one radial location that is positioned further from the edge of the crystalline structure than the respective region upon which the first line is based, and wherein the first and second lines cooperate to at least partially represent the profile of the crystalline structure proximate the edge of the crystalline structure.

19. A method of representing a shape of a crystalline structure proximate an edge of the crystalline structure comprising:

determining a thickness for each of a plurality of different radial locations on the crystalline structure;

determining a normalized profile of the crystalline structure based upon the average thickness for each of the plurality of different radial locations on the crystalline structure, and defining first and second lines at least partially based upon the thickness across at least partially different regions proximate the edge of the crystalline structure, wherein defining the first and second lines comprises defining the first line based at least partially upon the thickness across a respective region that includes at least one radial location that is positioned closer to the edge of the crystalline structure than the respective region upon which the second line is based, wherein defining the first and second lines further comprises defining the second line based at least partially upon the thickness across a respective region that includes at least one radial location that is positioned further from the edge of the crystalline structure than the respective region upon which the first line is based, wherein defining the first and second lines comprises defining the first and second lines based upon the normalized profile of the crystalline structure across at least partially different regions proximate the edge of the crystalline structure, and wherein the first and second lines cooperate to at least partially represent the profile of the crystalline structure proximate the edge of the crystalline structure.

20. A method of representing a share of a crystalline structure proximate an edge of the crystalline structure comprising:

determining a thickness for each of a plurality of different radial locations on the crystalline structure;

defining first and second lines at least partially based upon the thickness across at least partially different regions proximate the edge of the crystalline structure, wherein defining the first and second lines comprises defining the first line based at least partially upon the thickness across a respective region that includes at least one radial location that is positioned closer to the edge of the crystalline structure than the respective region upon which the second line is based, wherein defining the first and second lines further comprises defining the second line based at least partially upon the thickness across a respective region that includes at least one radial location that is positioned further from the edge of the crystalline structure than the respective region upon which the first line is based, and wherein the first and second lines cooperate to at least partially represent the profile of the crystalline structure proximate the edge of the crystalline structure; and graphically depicting the first and second lines.

21. A computer program product for representing a shape of a crystalline structure proximate an edge of the crystalline structure, wherein the computer program product comprises a computer-readable storage medium having computer-readable program instructions embodied in said medium, said computer-readable program instructions comprising:

first computer-readable program instructions for determining a thickness of the crystalline structure for each of a plurality of different radial locations on the crystalline structure;

second computer-readable program instructions for defining first and second lines at least partially based upon the thickness of the crystalline structure across at least partially different regions proximate the edge of the crystalline structure, wherein said second computer-readable program instructions define the first line based at least partially upon the thickness across a respective region that includes at least one radial location that is positioned closer to the edge of the crystalline structure than the respective region upon which the second line is based, and wherein said second computer-readable program instructions define the second line based at least partially upon the thickness across a respective region that includes at least one radial location that is positioned further from the edge of the crystalline structure than the respective region upon which the first line is based; and third computer-readable program instructions for determining a parameter selected from the group consisting of an angle θ defined between the first and second lines, a respective slope of each of the first and second lines, and an edge roll deviation of the crystalline structure.

22. A computer program product according to claim 21 further comprising fourth computer-readable program instructions for determining a distance Δ between the first and second lines at a predetermined point along the lines.

23. A computer program product according to claim 21 further comprising fifth computer-readable program instructions for determining a respective slope b for each of the first and second lines.

24. A computer program product according to claim 21 further comprising sixth computer-readable program instructions for determining a respective value a for each of the first and second lines at a center of the crystalline structure.

25. A computer program product according to claim 21 wherein said first computer-readable program instructions determine an average thickness for each of the plurality of different radial locations on the crystalline structure, wherein said first computer-readable program instructions determine the average thickness of the crystalline structure for a respective radial location by determining the average thickness based upon the thickness at a plurality of different angular positions for the respective radial location.

26. A computer program product for representing a shape of a crystalline structure proximate an edge of the crystalline structure, wherein the computer program product comprises a computer-readable storage medium having computer-readable program instructions embodied in said medium, said computer-readable program instructions comprising:

first computer-readable program instructions for determining a thickness of the crystalline structure for each of a plurality of different radial locations on the crystalline structure;

computer-readable program instructions for determining a normalized profile of the crystalline structure based upon the average thickness for each of the plurality of different radial locations on the crystalline structure, and second computer-readable program instructions for defining first and second lines at least partially based upon the thickness of the crystalline structure across at least partially different regions proximate the edge of the crystalline structure, wherein said second computer-readable program instructions define the first line based at least partially upon the thickness across a respective region that includes at least one radial location that is positioned closer to the edge of the crystalline structure than the respective region upon which the second line is based, and wherein said second computer-readable program instructions define the second line based at least partially upon the thickness across a respective region that includes at least one radial location that is positioned further from the edge of the crystalline structure than the respective region upon which the first line is based, wherein said second computer-readable program instructions define the first and second lines based upon the normalized profile of the crystalline structure across at least partially different regions proximate the edge of the crystalline structure.

27. A method for defining an average edge profile for a plurality of crystalline structures comprising:

determining an average thickness at a plurality of different angular positions for at least first and second radial locations proximate an edge of the plurality of crystalline structures; and determining the average edge profile at each of the plurality of different angular positions for the plurality of crystalline structures based at least partially upon a difference between the average thickness at the first radial location for the plurality of crystalline structures and the average thickness at the second radial location for the plurality of crystalline structures at each of the plurality of different angular positions.

28. A method according to claim 27 wherein determining the average thickness comprises separately determining, for each different angular position, the average thickness at the respective angular position for at least the first and second radial locations on each of the crystalline structures.

29. A method according to claim 27 further comprising graphically depicting the average edge profile at each of the plurality of different angular positions.

* * * * *

UNITED STATES PATENT AND TRADEMARK OFFICE
CERTIFICATE OF CORRECTION

PATENT NO. : 6,768,965 B2
DATED : July 27, 2004
INVENTOR(S) : Martin et al.

It is certified that error appears in the above-identified patent and that said Letters Patent is hereby corrected as shown below:

Title page,
Item [73], Assignee, "(CA)" should read -- (WA) --.

Signed and Sealed this

Twenty-first Day of December, 2004

JON W. DUDAS
*Director of the United States Patent and Trademark Office*